United States Patent [19]

Minden

[11] Patent Number: 5,606,414
[45] Date of Patent: Feb. 25, 1997

[54] INTERFEROMETRIC SHIP'S HEADING REFERENCE SYSTEM

[75] Inventor: Henry T. Minden, Concord, Mass.

[73] Assignee: Unisys Corporation, Blue Bell, Pa.

[21] Appl. No.: 481,134

[22] Filed: Apr. 1, 1983

[51] Int. Cl.$^6$ .............. G01B 9/02; G01C 19/00; G01C 21/00; G01P 15/08

[52] U.S. Cl. .............. 356/350; 33/321; 364/453; 364/454

[58] Field of Search .............. 356/350; 364/453, 364/454; 73/517 R; 33/321

[56] References Cited

U.S. PATENT DOCUMENTS

| | | | |
|---|---|---|---|
| 3,102,953 | 9/1963 | Wallace | 356/350 |
| 4,315,693 | 2/1982 | Walker | 356/350 |
| 4,343,035 | 8/1982 | Tanner | 364/453 |

*Primary Examiner*—Stephen C. Buczinski
*Attorney, Agent, or Firm*—Seymour Levine; Mark T. Starr

[57] ABSTRACT

Two Sagnac interferometers are mounted on board a ship with their axes in a horizontal plane. The axis of one interferometer is aligned in a fore-aft direction whereas the axis of the other interferometer is aligned athwartship. The output signals of the two interferometers are combined mathematically so as to cancel the effects of the ship's latitude and thus provide an output signal independent of this parameter.

6 Claims, 1 Drawing Sheet

INTERFEROMETRIC SHIP'S HEADING REFERENCE SYSTEM

BACKGROUND OF THE INVENTION

1. Field of the Invention

The present invention relates to navigational directional reference systems, and more specifically to navigational heading reference systems employing interferometric techniques.

2. Description of the Prior Art

Mechanical gryroscopes are commonly used for indicating and controlling the heading of ships and aircraft.

In the wake of advancing technology, various non-mechanical gyroscopes such as optical electromagnetic wave interferometric devices have been proposed.

The devices are based on the pioneering work of G. Sagnac who, inspired by the earlier work of A. A. Michelson, constructed a relatively compact rotatable interferometer with which angular rotation could be measured. Basically, Sagnac provided a closed optical path as depicted in FIG. 1. Light from a source 11 was incident beam into first and second internal beams 15 and 17 respectively. The internal beams were directed onto totally reflecting mirrors 19, 21 and 23 so as to form an optical path in which the internal beam 15 effectively rotates in a clockwise direction and beam 17 effectively rotates in a counter-clockwise direction. The two internal beams are diverted onto an observing and measuring means 25 by the beam-splitting mirror 13.

When such apparatus is rotated in the plane of the paper, the Sagnac interference fringes produced by the interfering beams are shifted. The direction and magnitude of the fringe shift are proportional to the direction and magnitude of the rotation rate. In the original Sagnac experiment the fringe shift was recorded photographically at the observing means 25.

It should be noted that the Sagnac device was responsive not only to rotation about the axis of the optical path, but also responsive to rotation about an axis outside the optical path. In fact, Sagnac's experiments were directed primarily at the measurement of the earth's rotation.

As described in U.S. Pat. No. 3,332,314, A. H. Rosenthal subsequently devised an optical interferometric navigational instrument using Sagnac interferometer techniques, but employing a radiation source such as a laser to provide a practical directional reference instrument.

Typically, Sagnac interferometric navigation instruments such as those envisioned by Rosenthal may employ photoelectric sensors which develop a beat frequency signal when exposed to the interfering output beams from the optical loop. The beat frequency represents the difference in frequency of the two internal signals caused by rotation of the apparatus as may be measured by straightforward techniques such as a frequency meter or pulse counter. The beat frequency thus may be utilized as a direct indication of the total angular velocity of the optical circuit. This total angular velocity, it should be noted, includes a component arising from the rotation of the earth at the latitude where the ship is located as well as a component arising from the ship's heading. In such devices, therefore, the ship'latitude must be determined and taken into account in calculating the desired value of the ship's heading. The interferometric ship's heading reference system of the present invention eliminates this need for latitude correction.

It will be appreciated by those skilled in the art that although the foregoing discussion was directed to a rectangular optical path, other workers in the art have developed Sagnac interferometers with circular or other non-rectangular shapes. Furthermore Sagnac interferometers have been developed using, light conducting materials such as lucite or optical fibers formed into a single circular loop or into a relatively flat coil of several loops in series.

SUMMARY OF THE INVENTION

The ship's heading reference system of the present invention employs a pair of Sagnac interferometers mounted vertically on board the ship such that the axis of one interferometer is in the fore-aft direction whereas the axis of the second interferometer is athwartship. The output signals of the two interferometers are mathematically combined so as to cancel the signal component arising as a function of the ship's latitude and thus provide an output independent of latitude.

DESCRIPTION OF THE PREFERRED EMBODIMENT

Figure 1:
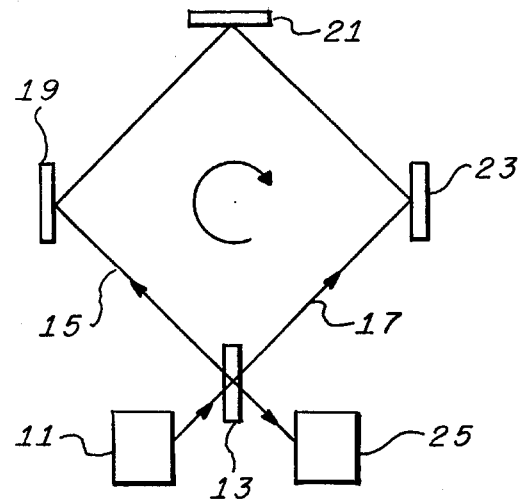
FIG. 1 is a diagram illustrating a prior art Sagnac interferometer useful in practicing the present invention.
Figure 2:
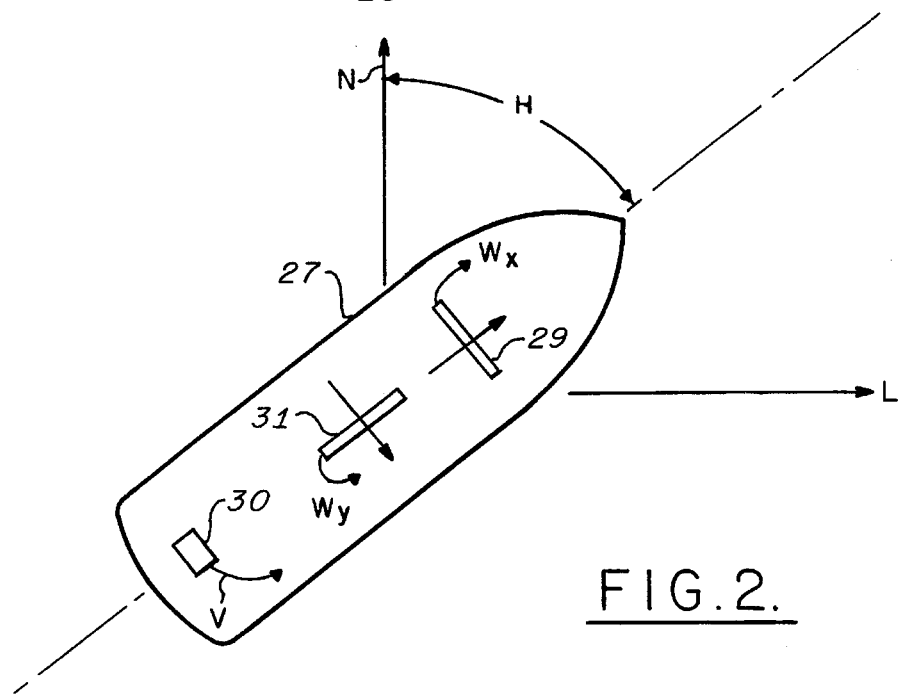
FIG. 2 is a diagram useful in explaining the present invention.

In practicing the present invention, a pair of Sagnac interferometers of the basic type illustrated in FIG. 1 are mounted on bard a ship 27 as illustrated in FIG. 2. The two interferometers are both mounted so that their optical paths are in vertical planes. However the first interferometer 29 is mounted with its axis in the fore-aft direction whereas second interferometer 31 is mounted with its axis athwartship.

As presently preferred, the interferometers employ multiple turns of optical fibers, but optical paths of the type illustrated in FIG. 1 or other known optical structures suitable for use in interferometers may be used if desired.

Similarly, the energy source equivalent to element 11 of FIG. 1 as presently preferred would employ a laser although other known sources of electromagnetic waves might be used if desired. Known types of transducers suitable for responding to the selected form of energy may be used. For laser sources, for instance, photoelectric sensors may be used together with appropriate electronic circuitry to measure the beat frequency of the interfering waves in each interferometer.

For purposes of explanation, assume that the vessel 27 of FIG. 2 is proceeding at a heading of H degress, and is located at a latitude of L degrees. Further assume that the vessel is proceeding at a velocity V.

The rotation $W_X$ sensed by the interferometer 29 is:

$$W_X = M \cos L \cos H$$

where:

M=earth's rotation rate

L=latitude

H=Heading

The rotation $W_Y$ sensed by the interferometer 31 is:

$$W_Y = M \cos L \sin H + V/R$$

where R is the earth's radius and V/R represents the equivalent rotational component due to the ship's speed.

Figure 3:
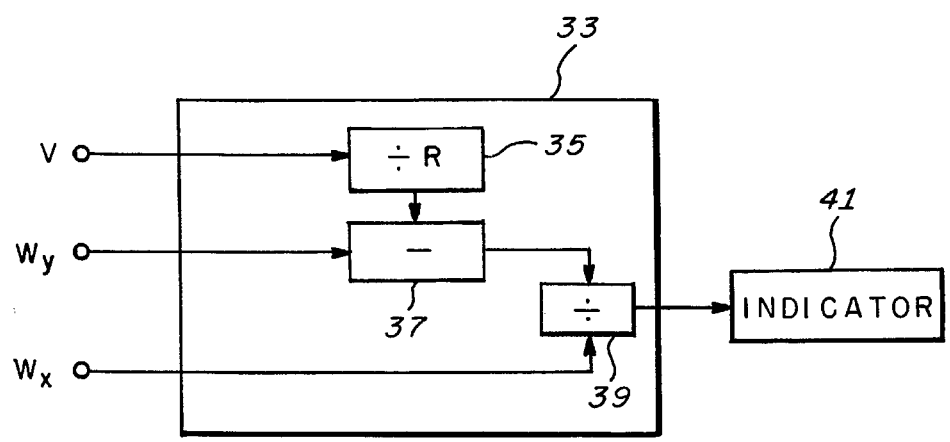
FIG. 3 is a block diagram indicating a signal processing circuit that may be used in practicing the invention.

The output signals of the interferometers representing the values of $W_X$ and $W_Y$ as well as a signal representing the velocity of the vessel are applied to a signal processing circuit 33 depicted in FIG. 3. The V signal may be derived from the ship's internal speed indicator 30.

The circuit 33 contains a signal divider 35 which serves to divide the velocity signal V by a factor R representative of the earth's radius. The output of the divider 35 is applied to a difference circuit 37 which serves to substract the V/R signal from the divider 35 from the value of the $W_Y$ signal. Thus the output of the difference circuit represents $W_Y$–V/R.

The output signal from the difference circuit and the $W_X$ signal are applied to a divider 39 which serves to divide the output signal from the difference circuit 37 by the value of $W_X$ and provide an input signal to an indicator 41 in accordance with the formula:

$$\frac{W_Y - V/R}{W_X} = \frac{M \cos L \sin H}{M \cos L \cos H} = \tan H$$

Thus the signal applied to the indicator 41 is representative of the heading of the vessel independent of the latitude and ship's speed.

Straightforward techniques may be used in the indicator circuit for converting the tan H signal into the equivalent reading in degrees.

The values of $W_X$ and $W_Y$ would be affected by pitch and roll of the vessel, however these values are relatively short term errors that can be accommodated by suitable filtering.

While the invention has been described in its preferred embodiments, it is to be understood that the words which have been used are words of description rather than limitation and that changes maybe made within the purview of the appended claims without departing from the true scope and spirit of the invention in its broader aspects.

I claim:

1. A ship's heading reference system comprising first Sagnac interferometer means for detecting total rotational movement in a vertical plane normal to the fore-aft axis of the ship; second Sagnac interferometer means for detecting total rotational movement in a vertical plane parallel to the fore-aft axis of the ship; said first and second Sagnac interferometer means including means for producing electrical signals representative of the detected rotational movement in each of said first and second Sagnac interferometer means; means for providing an electrical signal representative of the ship's forward speed; signal processing means coupled to receive the electrical signals from said first and second Sagnac interferometer means and said forward speed means; means in said signals processing means for eliminating the rotary component resulting from ship's speed from the output signal of said second Sagnac interferometer means; means for dividing the resultant signal by the signal from said first Sagnac interferometer means; and indicating means responsive to the output signal from said dividing means.

2. The heading indicating system of claim 1 wherein each interferometer is actuated by a laser.

3. A ship's heading reference system comprising first and second Sagnac interferometers, said first interferometer being mounted so that the axis of its optical path lies in a horizontal fore-aft direction, said second interferometer being mounted so that the axis of its optical path lies in a horizontal athwartship direction, each of said interferometers including means for producing electrical signals representative of the beat frequency produced by the interfering light beams in that interferometer, said reference system further including signal processing means, said signal processing means including means to receive a signal representative of the ship's velocity and the output signals from said interferometers, said signal processing means including means to modify the signal from said second interferometer so as to eliminate the rotary component in that signal arising from the ship's forward speed and means to divide the modified signal by the signal from said first interferometer, said heading reference system further including indicating means responsive to the output of the signal dividing means.

4. The heading reference system of claim 3 wherein the optical paths of each interferometer are formed from light conducting fibers.

5. The heading reference system of claim 3 wherein the optical paths of each interferometer are each constructed of optically conducting fibers formed into multi-turn circular coils.

6. The heading reference system of claim 3 wherein the signal modification means includes means to divide the signal representative of ship's speed by a signal representative of the earth's radius and means to subtract the divided signal from the output signal of said second interferometer.

* * * * *